(12) United States Patent
Panasik et al.

(10) Patent No.: US 7,181,192 B2
(45) Date of Patent: Feb. 20, 2007

(54) HANDHELD PORTABLE AUTOMATIC EMERGENCY ALERT SYSTEM AND METHOD

(75) Inventors: Carl M. Panasik, Garland, TX (US); James F. Salzman, Anna, TX (US)

(73) Assignee: Texas Instruments Incorporated, Dallas, TX (US)

( * ) Notice: Subject to any disclaimer, the term of this patent is extended or adjusted under 35 U.S.C. 154(b) by 219 days.

(21) Appl. No.: 10/802,449

(22) Filed: Mar. 16, 2004

(65) Prior Publication Data
US 2005/0208925 A1 Sep. 22, 2005

(51) Int. Cl.
*H04M 11/04* (2006.01)
(52) U.S. Cl. .................. 455/404.1; 455/404.2; 455/456.1; 455/456.3; 455/456.5; 455/456.6; 455/521; 455/550.1; 701/207; 701/213; 701/216; 340/436
(58) Field of Classification Search ......... 455/404.1, 455/404.2, 456.1–457, 432.1, 521, 550.1, 455/556.1–556.2, 569.1–569.2; 701/207, 701/213–214, 216; 340/436; 342/357.1, 342/357.06, 357.12, 450, 457
See application file for complete search history.

(56) References Cited

U.S. PATENT DOCUMENTS

| | | | | |
|---|---|---|---|---|
| 4,903,212 | A * | 2/1990 | Yokouchi et al. .......... 701/216 |
| 5,742,666 | A * | 4/1998 | Alpert .................. 455/404.2 |
| 6,299,102 | B2 * | 10/2001 | Happ ................... 244/122 AG |
| 6,549,792 | B1 * | 4/2003 | Cannon et al. .......... 455/550.1 |
| 6,821,249 | B2 * | 11/2004 | Casscells et al. .......... 600/300 |
| 2002/0013538 | A1 * | 1/2002 | Teller ..................... 600/549 |
| 2002/0098816 | A1 * | 7/2002 | Dooley et al. .......... 455/154.1 |
| 2002/0109600 | A1 * | 8/2002 | Mault et al. ............ 340/573.1 |
| 2002/0116080 | A1 * | 8/2002 | Birnbach et al. ............ 700/66 |
| 2002/0193091 | A1 * | 12/2002 | Zmarthie ................. 455/404 |
| 2003/0071446 | A1 * | 4/2003 | Haderer et al. ............ 280/735 |
| 2003/0071766 | A1 * | 4/2003 | Hartwell et al. ............ 345/8 |
| 2005/0128062 | A1 * | 6/2005 | Lundsgaard et al. ........ 340/436 |

OTHER PUBLICATIONS

Cell Phone Accelerometers/Sensors, Commsdesign.com, Mar. 16, 2004, pp. 1-3.*

(Continued)

*Primary Examiner*—Steve M. D'Agosta
(74) *Attorney, Agent, or Firm*—J. Dennis Moore; W. James Brady; Frederick J. Telecky, Jr.

(57) ABSTRACT

In one embodiment, an automated emergency alert system includes a handheld portable communication device operable to initiate communication over a wireless telecommunications network, a dynamic sensor operable to generate an acceleration profile for the device, and a memory operable to store one or more predefined acceleration profiles each associated with an emergency event. The system also includes one or more processors collectively operable to (1) receive from the dynamic sensor an acceleration profile for the device; (2) access one or more of the stored predefined acceleration profiles; (3) compare the received acceleration profile to the one or more stored predefined acceleration profiles to determine if the acceleration profile substantially matches a predefined acceleration profile; and (4) if it is determined that the acceleration profile substantially matches a stored predefined acceleration profile, initiate a communication using the network to one or more emergency call centers to notify the call center that the emergency event has occurred.

9 Claims, 1 Drawing Sheet

OTHER PUBLICATIONS

LEXSEE 14 FCCR 17388 In the Matter of Revision of the Commission's Rules to Ensure Compatibility with Enhanced 911 Emergency Calling Systems, Federal Communications Commission 14 FCC Rcd 17388; 1990 FCC LEXIS 4896; 16 Comm. Reg. (P&F) 739 Release No. FCC 99-245, Oct. 1, 1999 Released; Adopted Sep. 15, 1999 (37 pp).

NOKIA, http://www.nokia.com (19 pp.), print date Mar. 16, 2004.

On Star, http://www.onstar.com (11 pp.), print date Mar. 16, 2004.

Simon Fraser University, Centre for Systems Science, "Systems Specs: Activities of CSS Members," Update 15.3 Oct. 2003, *available at* http://www.css.sfu.ca/update/vol15/15.3-systems-specs.html (last visited Mar. 16, 2004) (2 pp.).

Byron Spice, "At CMU, Scientists are Building Sense into Cell Phones," post-gazette.com (Pittsburgh, Pa.), *available at* http://www.post-gazette.com/pg/03245/217276.stm (last visited Mar. 16, 2004) (3 pp.), Sep. 2, 2003.

"Cell Phone Accelerometers/Sensor," CommsDesign.com, *available at* http://www.commsdesign.com/new_products/showArticle.jhtml?articleID=16504859 (last visited Mar. 16, 2004) (3 pp.), May 23, 2002.

\* cited by examiner

HANDHELD PORTABLE AUTOMATIC EMERGENCY ALERT SYSTEM AND METHOD

TECHNICAL FIELD OF THE INVENTION

This invention relates generally to emergency alert communication and more particularly to a handheld portable automatic emergency alert system and method.

BACKGROUND

Persons involved in automobile accidents, medical emergencies, or other sorts of incidents requiring an emergency response are often incapacitated or otherwise unable to place a telephone call to appropriate emergency personnel, using the emergency "911" service for example. As an illustration, a person involved in a car accident may be knocked unconscious when his or her head collides with the steering wheel as a result of the impact. In the event that an emergency occurs in an automobile, current solutions for notifying emergency personnel include the ONSTAR™ system, which may be used to summons emergency personnel if the driver or another person presses an appropriate button. Of course, if the driver is incapacitated or otherwise cannot press the button, the authorities may not be notified of the accident as quickly as desired. A related solution includes using ONSTAR™ or a similar system to automatically call an emergency dispatcher in response to the airbag in an automobile being deployed. However, these solutions are limited to automobile-based implementations and are only able to summons help in response to certain emergency events.

SUMMARY OF THE INVENTION

According to the present invention, certain disadvantages and problems associated with previous techniques for emergency alert communication.

In one embodiment, an automated emergency alert system includes a handheld portable communication device operable to initiate communication over a wireless telecommunications network, a dynamic sensor operable to generate an acceleration profile for the handheld portable communication device, and a memory operable to store one or more predefined acceleration profiles, each predefined acceleration profile associated with an emergency event. The system also includes one or more processors collectively operable to (1) receive from the dynamic sensor an acceleration profile for the handheld portable communication device; (2) access one or more predefined acceleration profiles stored in the memory; (3) compare the acceleration profile received from the dynamic sensor to the one or more predefined acceleration profiles stored in the memory to determine if the acceleration profile substantially matches a predefined acceleration profile in the one or more predefined acceleration profiles; and (4) if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred.

Particular embodiments of the present invention may provide one or more technical advantages. In certain embodiments, the handheld portable communication device comprises all the needed equipment for use in providing automated emergency alert services. In addition, the handheld portable communication device may accompany an associated user at all times and thus is not limited to emergencies occurring in a particular automobile. In addition, particular embodiments may provide alerts for types of emergencies unrelated to automobile accidents. In certain embodiments, the handheld portable communication device may identify itself and/or its associated user associated, along with location information and the information from the one or more sensors, to the emergency call center, possibly shaving precious minutes from the time it takes for emergency medical or other personnel to arrive at the scene.

In certain embodiments, the handheld portable communication device may include one or more sensors for monitoring the environment of the user associated with the handheld portable communication device. For example, the handheld portable communication device may include a temperature sensor for possible detection of a fire. As another example, the handheld portable communication device may include a water sensor, which may detect whether the handheld portable communication device (and possibly the user associated with the device) is under water (e.g., because the car is under water). Therefore, particular embodiments may be able to detect many different types of emergency events.

Certain embodiments of the present invention may provide some, all, or none of the above technical advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and features and advantages thereof, reference is now made to the following description, taken in conjunction with the accompanying drawings, in which:

For a more complete understanding of the present invention and features and advantages thereof, reference is now made to the following description, taken in conjunction with the accompanying drawings, in which:

FIG. 1 illustrates an automated cellular alert system for automatically notifying emergency personnel of an emergency; and FIG. 2 illustrates an example method for automated emergency alert using a handheld portable communications device operable to initiate communication over a wireless telecommunications network.

DESCRIPTION OF EXAMPLE EMBODIMENTS

Figure 1:
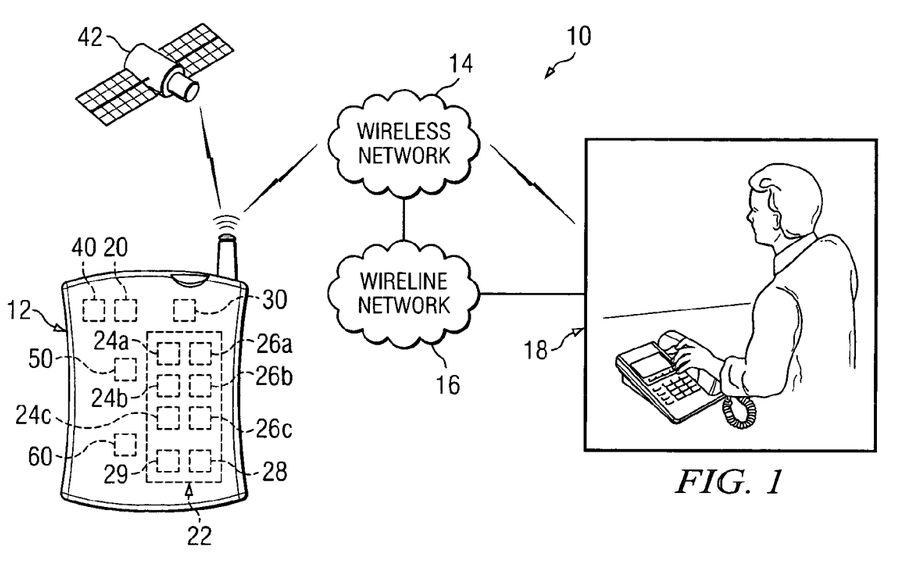
FIG. 1 illustrates an automated cellular alert system for automatically notifying emergency personnel of an emergency, according to an embodiment of the present invention.

FIG. 1 illustrates an automated cellular alert system 10 for automatically notifying emergency personnel of an emergency. In certain embodiments, system 10 includes a handheld portable communication device 12, a cellular or other wireless network 14, a telephone or other wireline network 16, and an emergency call center 18. Other embodiments of system 10 may be used without departing from the scope of this description. In general, handheld portable communication device 12 is operable to monitor the acceleration of device 12, to automatically detect the occurrence of an emergency event based at least on one or more acceleration profiles, and to automatically contact an emergency dispatcher associated with emergency call center 18 by making a wireless communication via wireless network 14. The term "automatically," as used herein, generally means that the appropriate processing is substantially performed by device 12 or other suitable components of system 10. It should be understood that automatically further contemplates any suitable user interaction with system 10, if appropriate.

Handheld portable communication device 12 may include any suitable device capable of engaging in wireless communication. For example, handheld portable communication device 12 may include a mobile phone, a personal digital assistant (PDA), a pager, or any other suitable handheld portable communication device capable of engaging in wireless communication. Typically, handheld portable communication device 12 is a device that a user would likely keep near his or her person when the user is mobile, or that the user could reasonably keep on his or her person under most circumstances if desired. The use of the term "handheld" to describe handheld portable communication device 12 is not meant in a literal sense and is not meant to limit handheld portable communication device 12 to those devices that can be held in a user's hand. Handheld portable communication device 12 may include one or more suitable input devices, output devices, storage media, processors, memory, or other components for receiving, processing, storing, and communicating information according to the operation of system 10. Furthermore, although the present invention focuses primarily on an embodiment in which wireless calls are automatically made by handheld portable communication device 12, the present invention contemplates handheld portable communication device 12 automatically communicating wireless emails, text messages, or any other suitable type of wireless communication according to particular needs.

Wireless network 14 includes any suitable communications network operable to facilitate wireless communication. Additionally, wireless network 14 represents any suitable collection and arrangement of equipment and infrastructure for supporting and providing wireless services to subscribers. Wireless network 14 may be associated with one or more wireless service providers. Although a single wireless network 14 is illustrated, wireless network 14 may encompass any number of wireless networks supporting any number of suitable protocols. For example, wireless network 14 may encompass both digital and cellular wireless telephone networks.

In general, wireless network is operable to facilitate wireless communication between handheld portable communication device 12 and one or more emergency dispatchers associated with emergency call center 18 in any suitable manner (or with any automated dispatch devices associated with emergency call center 18). In certain embodiments, wireless network 14 facilitates communication between handheld portable communication device 12 and one or more emergency dispatchers associated with emergency call center 18 that is wireless from end to end. For example, one or more emergency dispatchers associated with emergency call center 18 may be able to receive wireless communications from wireless network 14 or another suitable wireless network. In other embodiments, wireless network 14 may facilitate wireless communication and complete a connection to one or more emergency dispatchers associated with emergency call center 18 using wireline network 16. For example, one or more emergency dispatchers associated with emergency call center 18 may use communications equipment coupled to wireline network 16.

Wireline network 16 may include any suitable communications network operable to facilitate wireline communication. Additionally, wireline network 16 represents any suitable collection and arrangement of equipment and infrastructure for supporting and providing wireline services to subscribers. Wireline network 16 may be associated with one or more wireline service providers. Although a single wireline network 16 is illustrated, wireline network 16 may encompass any number of wireline networks supporting any number of suitable protocols or types of wireline communication (e.g., optical). In certain embodiments, wireline network 16 includes a public switched telephone network (PSTN).

Emergency call center 18 may include one or more emergency dispatchers. Although referred to as a "call center," emergency call center 18 may include any suitable individuals, entities, or machines for receiving communications for reporting emergencies. In certain embodiments, emergency call center 18 includes an emergency 911 emergency call center. For example, emergency call center may include what is typically referred to as a Public Safety Answering Point (PSAP), which may include a dispatch office that receives 911 calls from the public. A PSAP may include a local fire or police department, an ambulance service, a regional office covering numerous services, or any other suitable office or department. In certain embodiments, emergency call center 18 may be a local dispatch call center processing emergency communications in a localized area, a regional call center processing emergency communications in a regional area, or a central call center processing calls for any number of areas having any suitable size. Additionally, although emergency dispatchers are typically humans, the present invention contemplates emergency dispatchers being automated. Emergency call center may be operable to engage in communication with wireless network 14, wireline network 16, both, or any other suitable communications network operable to facilitate wireless communication.

Handheld portable communication device 12 includes a dynamic sensor 20 operable to measure acceleration, deceleration, or other suitable movement of handheld portable communication device 12. In certain embodiments, dynamic sensor 20 includes an accelerometer operable to generate an acceleration profile for handheld portable communication device 12. In certain embodiments, dynamic sensor 20 includes a silicon-based accelerometer such as an "on-chip" accelerometer. As just one example, dynamic sensor 20 may include an accelerometer such as those manufactured by ANALOG DEVICES, INC. In certain embodiments, it is desirable for dynamic sensor 20 to be a multi-axis accelerometer such that it is capable of detecting acceleration in multiple directions. Dynamic sensor 20 may be mounted on a printed circuit board within handheld portable communication device 12, although the present invention contemplates incorporating dynamic sensor 20 in handheld portable communication device 12 in any suitable manner.

Dynamic sensor 20 may output data representing the measured acceleration, deceleration, or lack thereof. An acceleration profile generated by dynamic sensor 20 may represent acceleration (or deceleration) as measured over time. In certain embodiments, the acceleration profile includes one or more discretely sampled acceleration values taken at predetermined time intervals. For example, dynamic sensor 20 may only output those acceleration values that exceed a predefined threshold. As another example, dynamic sensor 20 may output acceleration values every millisecond. Another suitable component of device 10 (e.g., a processor 30 described below) may package the reported acceleration values in any suitable manner to form an acceleration profile. Although described as an acceleration profile, the acceleration profile may represent both acceleration and deceleration of handheld portable communication device 12. Dynamic sensor 20 may generate an acceleration profile for handheld portable communication device 12 substantially continuously, at regular intervals, randomly, at the request of another component of handheld portable communication device 12, when acceleration or deceleration exceeds a threshold, or in any other suitable manner according to particular needs.

Suppose, for example, that handheld portable communication device 12 including dynamic sensor 20 is inside an automobile. As the car speeds up, the acceleration profile generated by dynamic sensor 20 may reflect a relatively smooth acceleration. Likewise, when the automobile slows in a normal fashion, the acceleration profile generated by dynamic sensor 20 may reflect a relatively smooth deceleration. As the car cruises at a substantially constant speed, the acceleration profile generated by dynamic sensor 20 may reflect that there is substantially no acceleration or deceleration. Suppose that the automobile is involved in an accident. The acceleration profile generated by dynamic sensor 20 may demonstrate that the automobile was involved in an accident (for example, due to rapid acceleration or deceleration, depending on whether the phone is sitting on a part such as a seat of the car or whether it is fixed on a passenger or otherwise fixed to the car). Different types of emergency events (including those other than car accidents) may result in a unique type of acceleration profile being generated by dynamic sensor 20. These different acceleration profiles may thus be used to identify that an emergency event has occurred.

Handheld portable communication device 12 may include a memory 22. Memory 22 may include any type of memory suitable for use in a handheld portable communication device 12. Furthermore, the present invention contemplates memory 14 located somewhere other than in handheld portable communication device 12 but accessible to handheld portable communication device 12, such as at a cellular base station or switching center of wireless network 14 for example. Memory 22 may include any memory or database module and may take the form of volatile or non-volatile memory including, without limitation, magnetic media, optical media, random access memory (RAM), read-only memory (ROM), removable media, flash memory, or any other suitable local or remote memory component.

Memory 22 is operable to store one or more predefined acceleration profiles 24. Although a particular number of predefined acceleration profiles 24 are illustrated, the present invention contemplates memory 22 storing any suitable number of predefined acceleration profiles 24. One or more of predefined acceleration profiles 24 are each associated with a different emergency event. Although a particular number of emergency events are illustrated, the present invention contemplates memory 22 storing any suitable number of emergency events. Additionally, although predefined acceleration profiles 24 are shown as having a one-to-one relationship with corresponding emergency events, more than one predefined acceleration profile 24 may be associated with a single emergency event and more than one emergency event may be associated with a single predefined acceleration profile 24.

An emergency event may include a definition of an emergency, including an identification of the emergency. For example, an identification of an emergency event may broadly identify an emergency, such as "car accident," "fall," or any other suitable identification of an emergency event. An identification of an emergency event may specifically identify an emergency, such as "head-on collision," "side-impact collision," "fall of x feet," or any other suitable identification of an emergency event. The definition of an emergency event may include any other suitable information regarding the identified emergency.

Each emergency event may be associated with one or more of the predefined acceleration profiles 24 as briefly described above. For example, a car accident may be associated with multiple predefined acceleration profiles 24. A particular type of car accident (head-on collision) may be associated with a subset of the acceleration profiles for automobile accidents, the subset including one or more predefined acceleration profiles 24. As another example, a person falling while wearing or holding handheld portable communication device 12 may be defined as an emergency event and may be associated with one or more predefined acceleration profiles 24. These acceleration profiles may be used to distinguish between normal dropping or other use of handheld portable communication device 12 and what is likely a genuine accident or emergency (as defined by emergency events). In certain embodiments, a peak absolute value of the acceleration output by dynamic sensor 20 may be used to identify the type of collision.

Returning to memory 22, memory 22 may be operable to store one or more prerecorded event messages 26. In certain embodiments, each prerecorded event message 26 is associated with one or more emergency events. For example, a prerecorded event message 26 may include a prerecorded message indicating that a car accident occurred or possibly occurred. The prerecorded event message 26 may provide any suitable information at any suitable level of detail, according to particular needs. In certain embodiments, memory 22 may include a generic event message 28 that does not indicated a type of emergency event, but merely indicates that an emergency of some sort occurred or possibly occurred. As described in more detail below, one or more event messages 26 or 28 may be communicated to emergency call center 18 in the event that an emergency event is determined to have occurred.

In certain embodiments, memory 22 is operable to store prerecorded user information 29 regarding a user associated with handheld portable communication device 12. For example, user information 29 may include the user's name, the user's telephone number, the user's home address, one or more contact numbers of persons associated with the user (e.g., an emergency contact person), insurance information for the user (e.g., carrier, subscriber number, coverage details, etc.), medical history information (e.g., medicines or other substances to which the user is allergic, an identification of one or more doctors of the user, existing medical conditions, current medications, etc.), the user's preferred hospital, or any other suitable information according to particular needs. As described in more detail below, user information 29 may be communicated to emergency call center 18 in the event that an emergency event is determined to have occurred.

In certain embodiments, handheld portable communication device 12 includes one or more processors 30. Although a single processor 30 is illustrated, the present invention contemplates handheld portable communication device 12 including any suitable number of processors 30 collectively operable to perform the functions described herein with reference to processor 30. Processor 30 may perform these functions in conjunction with any suitable software, firmware, hardware, or combination thereof, such as software code stored in memory 22 for example.

Processor 30 may be operable to receive one or more acceleration profiles for handheld portable communication device 12 from dynamic sensor 20. In certain embodiments, dynamic sensor 20 communicates an acceleration profile for handheld portable communication device 12 to processor 30 at a predetermined interval (e.g., every three seconds). In certain embodiments, dynamic sensor 20 communicates a substantially continuous acceleration profile for handheld portable communication device 12 to processor 30. In response, processor 30 may subdivide the received signal into one or more blocks of time, of a fixed length for example. In certain embodiments, dynamic sensor 20 communicates an acceleration profile to processor 30 in response to the acceleration profile reflecting that the acceleration of dynamic sensor 30 (and handheld portable communication device 12) exceeds a predetermined threshold acceleration or deceleration. For example, the predetermined threshold acceleration may help distinguish between normal dropping of the phone and more significant events (which may ultimately be determined to be an emergency event). In each of these embodiments, communication by dynamic sensor 20 may be automatic, in response to a request from processor 30, continuous or otherwise.

Processor 30 may be operable to access the predefined acceleration profiles 24 stored in memory 22 in any suitable manner, according to particular needs. In certain embodiments, processor 30 accesses predefined acceleration profiles 24 in response to receiving an acceleration profile for handheld portable communication device 12 from dynamic sensor 20.

Processor 30 may be operable to determine whether an emergency event has occurred. For example, processor 30 may use information such as the acceleration profiles generated by dynamic sensor 20 to determine whether an emergency event has occurred. This determination helps processor 30 determine whether a real emergency event, such as an accident of some sort, has occurred, as opposed to someone merely dropping or throwing handheld portable communication device 12 for example. In certain embodiments, processor 30 compares an acceleration profile received from dynamic sensor 20 to one or more of predefined acceleration profiles 24 stored in memory 22 to determine if the acceleration profile substantially matches a predefined acceleration profile 24. The term "substantially" is used to indicate that in certain embodiments, an exact match between the acceleration profile and a predefined acceleration profile 24 may not be required. For example, certain margins of error may be predefined and if the acceleration profile is determined to match a predefined acceleration profile 24 within those predefined margins of error, a match may still be determined to exist.

In certain embodiments, processor 30 continuously monitors an acceleration profile being generated by dynamic sensor 20 and performs the comparison of the acceleration profile to the one or more prerecorded acceleration profiles when a certain triggering event occurs (e.g., the acceleration profile received from dynamic sensor 20 indicates an acceleration or deceleration exceeding a predetermined threshold). In certain embodiments, dynamic sensor 20 determines whether the acceleration profile indicates an acceleration or deceleration that exceeds a predetermined threshold before communicating an acceleration profile to processor 30, prompting processor 30 to perform the comparison. Dynamic sensor 20 may simply prompt processor 30 to retrieve an acceleration profile, from memory 22 for example. In other embodiments, processor 30 continuously processes one or more acceleration profiles generated by dynamic sensor 20.

In certain embodiments, if processor 30 determines that an acceleration profile received from dynamic sensor 20 substantially matches a predefined acceleration profile 24 stored in memory 22, processor 30 may initiate a communication using wireless network 14 to an emergency call center 18. In certain embodiments, the match may be to an initial event and then within a predetermined time window, to a second event. For example, in a front-end collision in a car, device 10 may experience a first acceleration when the car experiences an impact and a secondary deceleration when the phone impacts the floor or the dashboard. These two impacts (and acceleration/deceleration) would likely be separated in time by only a few milliseconds.

In certain embodiments, processor 30 initiates a wireless telephone call to emergency call center 18. For example, via the wireless telephone call to emergency call center 18, processor 30 may initiate playback of a generic prerecorded event message 28 indicating that a generic emergency event occurred, a prerecorded event message 26 specific to the determined emergency event, a prerecorded message including user information 29 regarding the user associate with handheld portable communication device 12, a combination of the above, or any other suitable messages or information according to particular needs. In certain embodiments, some or all of this prerecorded information may be communicated using a cellular baseband including the prerecorded information.

In certain embodiments, processor 30 initiates a wireless email communication to dispatch call center 18. For example, processor 30 may facilitate inclusion in the wireless email to emergency call center 18 a generic event message 28 indicating that a generic emergency event occurred, an event message 26 specific to the determined emergency event, a message including user information 29 regarding the user associate with handheld portable communication device 12, a combination of the above, or any other suitable messages according to particular needs. It should be noted that although particular methods of notifying dispatch call center 18 that an accident (e.g., an emergency event) has occurred, the present invention contemplates device 12 notifying dispatch call center 18 of the accident (e.g., the emergency event) in any suitable manner.

In certain embodiments, system 10 includes an ability to determine a location of handheld portable communication device 12. The location information of handheld portable communication device 12 may be reported by processor 30 or another suitable component of system 10 (e.g., a component within wireless network 14) to emergency call center 18. In certain embodiments, it is desirable for the determined location of handheld portable communication device 12 to be relatively precise. Although particular examples for providing this location capability of system 10 are described below, the location capability of system 10 may be implemented in any suitable manner, according to particular needs.

In certain embodiments, one or more components within wireless network 14 include the ability to determine the location of handheld portable communication device 12. Handheld portable communication device 12, wireless network 14, emergency call center 18, and any other suitable component of system 10 may include any suitable software, hardware, or firmware components for implementing this location capability. In certain embodiments, this location capability is implemented using cellular-network-triangulation or angle-of-arrival techniques. In certain embodiments, this location capability may be implemented in a substantially similar or equivalent manner to the location capabilities required by or being implemented in response to the current Enhanced 911 ("E911") mandate promulgated by the U.S. Federal Communication Commission (FCC). In general, the E911 mandate sets out in two phases various deadlines for wireless service providers to implement required technology and services for providing 911 dispatchers with additional information for wireless 911 calls. For example, Phase I requires reporting of the telephone number of a 911 wireless caller and the location of the antenna that received the 911 call. Phase II requires more precise location information of the 911 wireless caller, within fifty meters for sixty-seven percent of calls and within one hundred fifty meters for ninty-five percent of calls.

In certain embodiments, handheld portable communication device 12 includes a location receiver 40 operable to facilitate a determination of a location of handheld portable communication device 12. For example, in certain embodiments, location receiver 40 includes a global positioning system (GPS) receiver. Although an embodiment in which location receiver 40 includes a GPS receiver is primarily described, the present invention contemplates location receiver 40 including any suitable type of receiver operable to facilitate a determination of a relatively precise location of handheld portable communication device 12 (e.g., a receiver operable to function in a global navigation satellite system (GLONASS) or other suitable navigation system.

In an example in which location receiver 40 includes a GPS receiver or other relatively precise location-determining receiver, location receiver 40 may receive signals from one or more satellites 42 to determine a relatively precise location of handheld portable communication device 12. The determined relatively precise location information may be communicated by processor 30 or another suitable component of handheld portable communication device 12 to emergency call center 18, if appropriate. In certain embodiments, location receiver 40 continuously or at another suitable interval receives and processes signals from one or more satellites 42 to determine the location of handheld portable communication device 12. In certain embodiments, processor 30, in response to determining that an emergency event has occurred, may invoke location receiver 40 to perform steps for determining the location of handheld portable communications device 12 (e.g., by receiving the signal from one or more satellites 42).

In certain embodiments, processor 30 may use the location information obtained by location receiver 40 (e.g., in an embodiment in which location receiver 40 is a GPS receiver) to help determine whether an emergency event has occurred. For example, processor 30 may determine a velocity of handheld portable communication device 12 using the location information. To determine the average velocity over a time interval, location receiver 40 may communicate location information to processor 30 at a regular interval (i.e., either automatically or in response to requests from processor 30), and processor 30 may use the location information to calculate the velocity as the quotient of the change in distance (a second reported location minus a first reported location) and the change in time (the time when the second reported location was generated or received minus the time when the first reported location was generated or received). In certain embodiments, the change in time variable of the equation may be assumed to be the regular interval (e.g., every five seconds) at which location information is received.

In certain embodiments, determined velocity information may be included as part of an acceleration profile. Processor 30 may use this information, in addition to acceleration information, to determine whether or what type of an emergency event has occurred. For example, if handheld communication device 12 is traveling at sixty miles per hour just prior to the time when a rapid acceleration or deceleration is indicated by the acceleration profile, it very likely that handheld portable communication device 12 was in some sort of automated transportation. Similarly, if the velocity of handheld portable communication device 12 resumes to a substantially similar rate just after a rapid acceleration or deceleration is indicated by dynamic sensor 20, it is less likely that handheld portable communication device 12 was involved in an collision (e.g., perhaps it was just thrown by someone in the automobile). Using the location information in addition to the acceleration information may help reduce or eliminate false alarms (i.e. determinations that an emergency event occurred, when in fact it did not).

In certain embodiments, handheld portable communication device 12 includes a temperature sensor 50 operable to monitor the temperature at or near handheld portable communication device 12. Processor 30 may receive from temperature sensor 50 information regarding the temperature at or near handheld portable communication device 12. In certain embodiments, if the temperature information indicates that the temperature at or near handheld portable communication device 12 exceeds a predefined threshold temperature, processor 30 may communicate a message regarding the temperature to emergency call center 18. The predefined threshold temperature may include a minimum temperature, a maximum temperature, or both, and may be stored in memory 22. For example, the predefined threshold temperature may be two hundred degrees Fahrenheit, although the present invention contemplates any suitable predefined threshold temperature. Thus, in certain embodiments, temperature sensor 50 may be useful for monitoring the environment after an emergency event, such as a car accident, is determined to have occurred, possibly for detecting a fire.

In certain embodiments, handheld portable communication device 12 includes a water sensor 60 operable to monitor whether handheld portable communication device 12 is under water. Processor 30 may receive from water sensor 60 information regarding whether handheld portable communication device 12 is under water. In certain embodiments, if the information received from water sensor 60 indicates that handheld portable communication device 12 is under water, processor 30 may communicate a message regarding the underwater status to emergency call center 18. Thus, in certain embodiments, water sensor 60 may be useful for monitoring the environment after an emergency event, such as a car accident, is determined to have occurred, possibly for detecting that a user of handheld portable communication device 12 is now under water. In certain embodiments, it may be desirable for handheld portable communication device to be somewhat water resistant to increase the chances that processor 30 can communicate a message regarding the underwater status to emergency call center 18. In certain embodiments, all of these notification functions are performed without user intervention.

In certain embodiments, device 10 emits a warning signal that a notification is about to be communicated to an emergency call center 18. A CANCEL or other suitable button may be included on device 10, which may be used in the event that a notification should not be communicated or to abort a communication that is currently being sent. As an example, a time limit (e.g., five seconds) may be predefined such that a user must cancel initiation of the call within the predefined time limit after the warning signal is emitted or the notification will be communicated.

In certain embodiments, device 10 includes a microphone, which may be operable to "listen" to the environment around device 10. Information to which the microphone "listens" may be recorded, if appropriate. The microphone may also help determine whether an emergency event occurred. For example, if the microphone "hears" the air bag deploy, this may provide confirmation that an emergency event occurred. In certain embodiments, a connection between device 10 and emergency call center 18 may be maintained after an emergency notification call is placed, such that a dispatcher can hear what is happening around device 10.

Particular embodiments of the present invention may provide one or more technical advantages. In certain embodiments, handheld portable communication device 12 comprises all the needed equipment for use in providing automated emergency alert services. In addition, handheld portable communication device 12 may accompany an associated user at all times and thus is not limited to emergencies occurring in a particular automobile. In addition, particular embodiments may provide alerts for types of emergencies unrelated to automobile accidents. In certain embodiments, handheld portable communication device 12 may identify itself and/or its associated user, along with location information and the information from the one or more sensors, to emergency call center 18, possibly shaving precious minutes from the time it takes for emergency medical or other personnel to arrive at the scene.

In certain embodiments, handheld portable communication device 12 may include one or more sensors for monitoring the environment of the user associated with the handheld portable communication device. For example, handheld portable communication device 12 may include temperature sensor 50 for possible detection of a fire. As another example, handheld portable communication device 12 may include water sensor 60, which may detect whether handheld portable communication device 12 (and possibly the user associated with device 12) is under water (e.g., because the car is under water). Therefore, particular embodiments may be able to detect many different types of emergency events.

Figure 2:
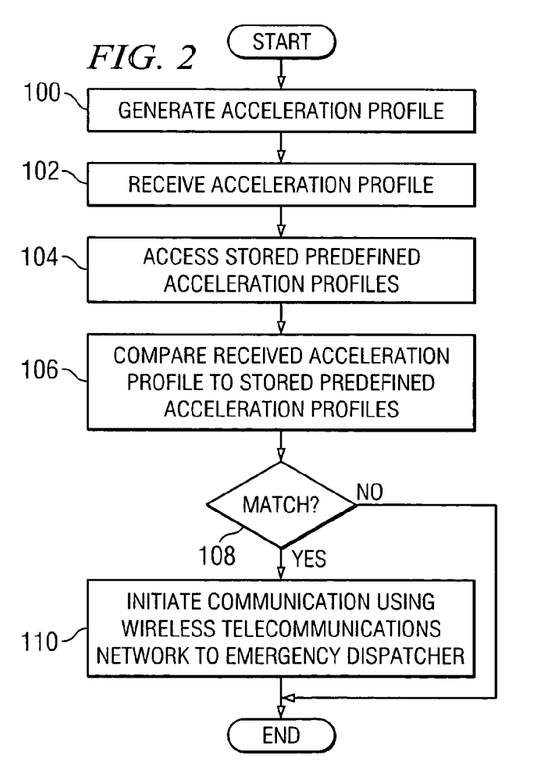
FIG. 2 illustrates an exemplary method according to an embodiment of the present invention for automated emergency alert using a handheld portable communications device operable to initiate communication over a wireless telecommunications network.

FIG. 2 illustrates an example method for automated emergency alert using a handheld portable communications device 10 operable to initiate communication over a wireless telecommunications network 14. At step 100, dynamic sensor 20 generates an acceleration profile for handheld portable communication device 12. Dynamic sensor 20 may generate an acceleration profile for handheld portable communication device 12 substantially continuously, at regular intervals, randomly, at the request of another component of handheld portable communication device 12, or in any other suitable manner according to particular needs.

At step 102, processor 30 may receive from dynamic sensor 20 an acceleration profile for handheld portable communication device 12. As described in more detail above with reference to FIG. 1, processor 30 may receive an acceleration profile from dynamic sensor 20 at a predetermined interval (e.g., every three seconds), substantially continuously, or at any other suitable interval.

At step 104, processor 30 may access predefined acceleration profiles 24 stored in memory 22. At step 106, processor 30 may compare the acceleration profile received for handheld portable communication device 12 from dynamic sensor 20 to one or more predefined acceleration profiles 24 stored in memory 22 to determine whether the acceleration profile substantially matches a predefined acceleration profile 24. In certain embodiments, processor 30 continuously monitors an acceleration profile being generated by dynamic sensor 20 and performs the comparison of the acceleration profile to the one or more prerecorded acceleration profiles when a certain triggering event occurs (e.g., the acceleration profile received from dynamic sensor 20 indicates an acceleration or deceleration exceeding a predetermined threshold). In certain embodiments, dynamic sensor 20 determines whether the acceleration profile indicates an acceleration or deceleration that exceeds a predetermined threshold before communicating an acceleration profile to processor 30, prompting processor 30 to perform the comparison. Dynamic sensor 20 may simply prompt processor 30 to retrieve an acceleration profile, from memory 22 for example. In other embodiments, processor 30 substantially continuously monitors one or more acceleration profiles generated by dynamic sensor 20. In yet another embodiment, the acceleration or deceleration of device 10 may trigger a call to a wireless link associated with the automobile in order to report the status of the automobile. For example, if device 10 has just accelerated or decelerated, then information that the engine has stopped or that the airbags have been deployed could be conveyed to device 10 by the automobile for emergency notification.

At step 108, if a substantial match is determined, then at step 110, processor 30 may initiate a communication using wireless communication network 14 to one or more emergency call centers 18 to notify the one or more emergency call centers that the emergency event has occurred. This communication may be performed in any suitable manner and may include any suitable information, as described above with reference to FIG. 1. If no match is determined at step 108, then the method may end. This method may be repeated continually or each time an acceleration profile is generated.

Although a particular method for automated emergency alert using a handheld portable communications device 12 has been described with reference to FIG. 2, the present invention contemplates any suitable method for automated emergency alert using a handheld portable communications device 12 in accordance with the present invention. Thus, certain of the steps described with reference to FIG. 2 may take place simultaneously and/or in different orders than as shown. Moreover, handheld portable communication device 12 may use methods with additional steps, fewer steps, and/or different steps, so long as the methods remain appropriate.

For example, processor 30 may determine a location of handheld portable communication device 12, using one or more components of wireless communication network 14 or a location sensor 40 for example. Processor 30 may use this determined location information, or other information determined using this location information (e.g., velocity), to help determine whether an emergency event has occurred. As another example, processor 30 may, using temperature sensor 50 or water sensor 60, substantially continuously monitor the environment around handheld portable communication device 12. As another example, the processor 30 may use information from the automobile provided via a wireless connection, using BLUETOOTH™, for example, to fuse with information generated by one or more of dynamic sensor 20, temperature sensor 50, and water sensor 60.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An automated emergency alert system, comprising:
a handheld portable communication device operable to initiate communication over a wireless telecommunications network, and comprising a location receiver operable to determine a location of the handheld portable communication device;
a dynamic sensor operable to generate an acceleration profile for the handheld portable communication device;
a memory operable to store one or more predefined acceleration profiles, each predefined acceleration profile associated with an emergency event;
one or more processors collectively operable to:
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred, wherein the one or more processors are operable to:
determine a velocity of the handheld portable communication device using the location receiver; and
in addition to determining whether the acceleration profile received from the dynamic sensor substantially matches a predefined acceleration profile stored in the memory, use the determined velocity to determine whether an emergency event has occurred.

2. An automated emergency alert system, comprising:
a handheld portable communication device operable to initiate communication over a wireless telecommunications network, and comprising a location receiver operable to determine a location of the handheld portable communication device;
a dynamic sensor operable to generate an acceleration profile for the handheld portable communication device;
a memory operable to store one or more predefined acceleration profiles, each predefined acceleration profile associated with an emergency event;
one or more processors collectively operable to:
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred, wherein the one or more processors are further operable to communicate location information identifying the location of the handheld portable communication device to the one or more emergency call centers if it is determined that the acceleration profile received from the dynamic sensor substantially matches a predefined acceleration profile stored in the memory.

3. An automated emergency alert system, comprising:
a handheld portable communication device operable to initiate communication over a wireless telecommunications network;
a dynamic sensor operable to generate an acceleration profile for the handheld portable communication device;
a memory operable to store one or more predefined acceleration profiles, each predefined acceleration profile associated with an emergency event;
one or more processors collectively operable to;
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred,
wherein one or more components in the wireless communication network are operable to determine a location of the handheld portable communication device in compliance with an enhanced 911 (E911) mandate and to communicate this location to the emergency call center.

4. An automated emergency alert system, comprising:
a handheld portable communication device operable to initiate communication over a wireless telecommunications network;
a dynamic sensor operable to generate an acceleration profile for the handheld portable communication device;
a memory operable to store one or more predefined acceleration profiles, each predefined acceleration profile associated with an emergency event;
one or more processors collectively operable to;
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred,
wherein:
  the memory is further operable to store one or more prerecorded emergency event messages, each event message associated with one or more emergency events; and
  the one or more processors are further operable to communicate a prerecorded event message to the emergency call center when a substantial match is determined.

5. An automated emergency alert system, comprising:
a handheld portable communication device operable to initiate communication over a wireless telecommunications network;
a dynamic sensor operable to generate an acceleration profile for the handheld portable communication device;
a memory operable to store one or more predefined acceleration profiles, each predefined acceleration profile associated with an emergency event;
one or more processors collectively operable to;
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred,
wherein:
  the memory is further operable to store prerecorded user information regarding a user associated with the handheld portable communication device; and
  the one or more processors are further operable to communicate the prerecorded user information regarding the user to the emergency call center when a substantial match is determined.

6. An automated emergency alert system, comprising:
a handheld portable communication device operable to initiate communication over a wireless telecommunications network;
a dynamic sensor operable to generate an acceleration profile for the handheld portable communication device;
a memory operable to store one or more predefined acceleration profiles, each predefined acceleration profile associated with an emergency event;
one or more processors collectively operable to;
receive from the dynamic sensor an acceleration profile for the handheld portable communication device, the acceleration profile comprising a plurality of discretely sampled acceleration values taken at predetermined time intervals;
  access one or more predefined acceleration profiles stored in the memory;
  compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred,
further comprising a temperature sensor operable to monitor a temperature near the handheld portable communication device, the one or more processors further operable to:
  receive from the temperature sensor temperature information regarding the temperature near the handheld portable communication device; and
  if the information received indicates that the temperature near the handheld portable communication device exceeds a predefined threshold temperature, communicate a message regarding the temperature to the one or more emergency call centers.

7. An automated emergency alert system, comprising:
a handheld portable communication device operable to initiate communication over a wireless telecommunications network;
a dynamic sensor operable to generate an acceleration profile for the handheld portable communication device;
a memory operable to store one or more predefined acceleration profiles, each predefined acceleration profile associated with an emergency event;

one or more processors collectively operable to;
receive from the dynamic sensor an acceleration profile for the handheld portable communication device, the acceleration profile comprising a plurality of discretely sampled acceleration values taken at predetermined time intervals;
access one or more predefined acceleration profiles stored in the memory;
compare the acceleration profile received from the dynamic sensor to the one or more predefined acceleration profiles stored in the memory to determine if the acceleration profile substantially matches a predefined acceleration profile in the one or more predefined acceleration profiles; and
if it is determined that the acceleration profile received from the dynamic sensor substantially matches a predefined acceleration profile in the one or more predefined acceleration profiles stored in the memory, initiate a communication using the wireless telecommunications network to one or more emergency call centers to notify the emergency call center that the emergency event has occurred,
further comprising a water sensor operable to monitor whether the handheld portable communication device is under water, the one or more processors further operable to:
receive from the water sensor information regarding whether the handheld portable communication device is under water; and
if the information received indicates that the handheld portable communication device is under water, communicate a message indicating that the handheld portable communication device is under water to one or more emergency call centers.

8. A method for automated emergency alert using a handheld portable communications device operable to initiate communication over a wireless telecommunications network, comprising:
determining a location of the handheld portable communication device using a global positioning system (GPS) receiver associated with the handheld portable communication device;
storing one or more predefined acceleration profiles, the acceleration profile comprising a plurality of discretely sampled acceleration values taken at predetermined time intervals, each predefined acceleration profile associated with an emergency event;
receiving an acceleration profile for the handheld portable communication device;
accessing one or more of the stored predefined acceleration profiles;
comparing the acceleration profile to the one or more stored predefined acceleration profiles to determine if the acceleration profile substantially matches a predefined acceleration profile in the one or more predefined acceleration profiles; and if it is determined that the acceleration profile substantially matches a stored predefined acceleration profile in the one or more predefined acceleration profiles, initiating a communication using the wireless telecommunications network to one or more emergency call centers to notify the emergency call center that the emergency event has occurred, further comprising:
determining a velocity of the handheld portable communication device using a location receiver; and
in addition to determining whether the acceleration profile received from the dynamic sensor substantially matches a predefined acceleration profile stored in the memory, using the determined velocity to determine whether an emergency event has occurred.

9. A method for automated emergency alert using a handheld portable communications device operable to initiate communication over a wireless telecommunications network, comprising:
determining a location of the handheld portable communication device using a global positioning system (GPS) receiver associated with the handheld portable communication device;
storing one or more predefined acceleration profiles, the acceleration profile comprising a plurality of discretely sampled acceleration values taken at predetermined time intervals, each predefined acceleration profile associated with an emergency event;
receiving an acceleration profile for the handheld portable communication device;
accessing one or more of the stored predefined acceleration profiles;
comparing the acceleration profile to the one or more stored predefined acceleration profiles to determine if the acceleration profile substantially matches a predefined acceleration profile in the one or more predefined acceleration profiles; and
if it is determined that the acceleration profile substantially matches a stored predefined acceleration profile in the one or more predefined acceleration profiles, initiating a communication using the wireless telecommunications network to one or more emergency call centers to notify the emergency call center that the emergency event has occurred, further comprising communicating location information identifying the location of the handheld portable communication device to the one or more emergency call centers if it is determined that the acceleration profile substantially matches a predefined acceleration profile.

* * * * *